(No Model.)
W. R. H. SCHEUNERT.
Cigar Lighting Lamp.
No. 236,183. Patented Jan. 4, 1881.
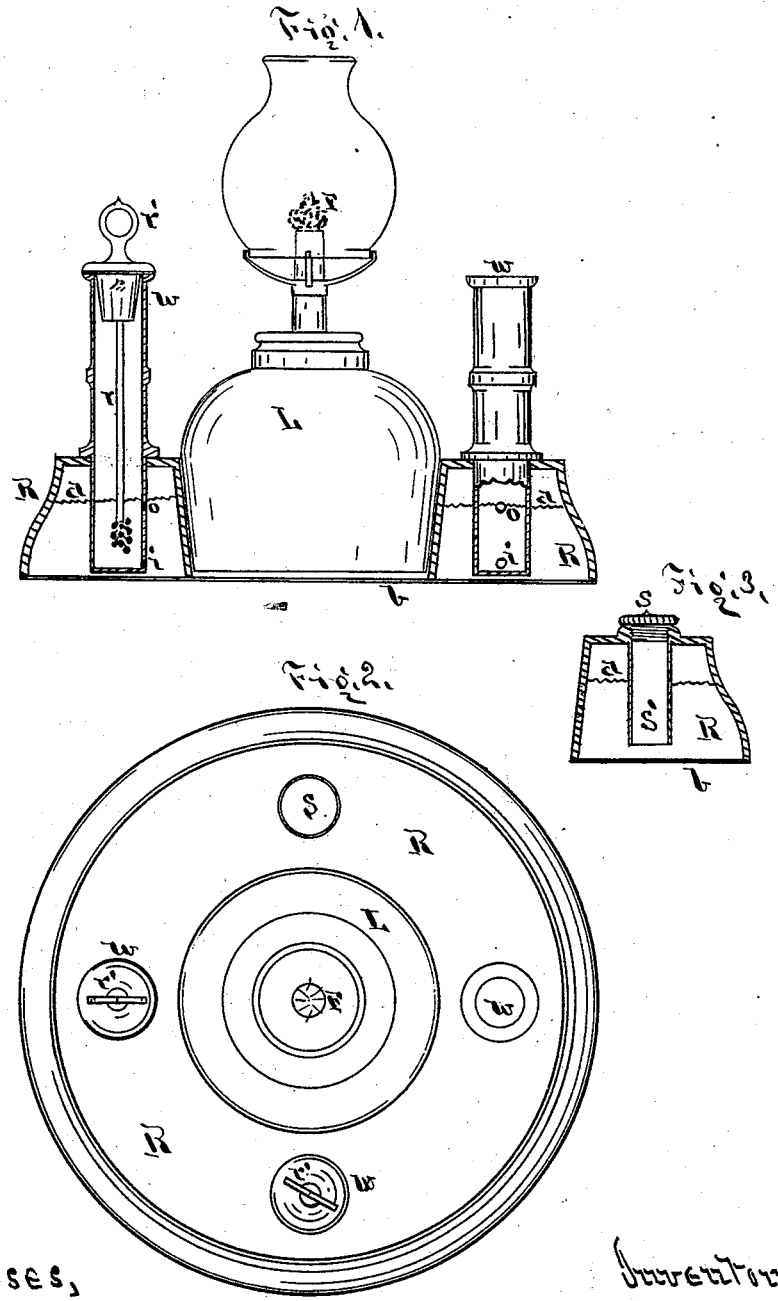

United States Patent Office.

WILHELM R. H. SCHEUNERT, OF SACRAMENTO, CALIFORNIA.

CIGAR-LIGHTING LAMP.

SPECIFICATION forming part of Letters Patent No. 236,183, dated January 4, 1881.

Application filed September 11, 1880. (No model.)

*To all whom it may concern:*

Be it known that I, WILHELM R. H. SCHEUNERT, of the city of Sacramento, State of California, have invented a new and useful Improvement in Cigar-Lighting Lamps, of which the following is a specification.

The invention relates to that class of cigar-lighters in which wires are used to light the cigar by dipping the ends of the wire in a well of alcohol and then lighting the saturated end of the wire by a permanently-burning flame; and the invention consists in the peculiar manner of supplying the alcohol-wells with alcohol, so that a constant depth of alcohol will be supplied in the well from a reservoir to which the alcohol-wells are connected, while at the same time the reservoir acts as a base or holder for the lamp, which keeps up a constant flame, used for lighting the wires after being dipped in alcohol.

I am aware that lamps provided with alcohol-wells into which wires are dipped, and after being dipped and having their saturated ends lit by the lamp used for lighting cigars, is a device that is known and in common use; but my invention consists of certain improvements, of which the following is a description.

By reference to Figure 1, which is a sectional elevation of the lighter, R is the reservoir, made, in this case, in the form of a hollow annular ring, in the center of which is placed the lamp L, used for keeping a constant flame, F. w are the wells containing alcohol, into which the wire r is dipped, so that its lower end will be saturated, and when lit by the flame F will be used for lighting the cigar. r' is the handle for holding the rod r, which is provided with a cork, r'', that fills the opening of w, thus preventing evaporation. One or more of these wells w may be used, as shown.

Fig. 3 is a sectional detail of part of the reservoir R, in which s is a cap, which, being unscrewed, presents an opening into which a supply can be poured. In this case the alcohol is shown filled up to line a. The tube s' extends down below the surface of the alcohol, and the top of the reservoir R being made air-tight prevents any air from entering at the top, and thereby prevents any alcohol from running out at the bottom for want of proper vent.

Fig. 2 is a plan of Fig. 1, showing flame F, lamp L, reservoir R, wells w w w, and feed-opening s.

By referring to Fig. 1 will be seen a sectional view of the apparatus, in which the surface of the alcohol is shown at a. The wells w extend through the top of the reservoir R and reach nearly to the bottom of the same. At the bottom of the wells w are small holes i, through which the alcohol passes into the wells w, while at the same time the air is entering from the wells into R through the small apertures o, made at the height that it is desired to have the alcohol rise in the wells w. While the alcohol is below the apertures o they act as vent-holes in letting air in R while the alcohol passes out through i into w; but when the alcohol has risen as high as o it prevents any more air from entering R, and prevents any more alcohol from flowing out into w until the alcohol in w is used or lowered below o, when more air enters and more alcohol comes out, and thus a constant and limited supply is kept in the wells w.

By making the reservoir-ring as shown, it makes a recess into which the lamp L may be placed, and makes the article in a form easily constructed out of cast-metal, the bottom b being made of sheet metal and soldered on the part R.

What I claim as my invention is—

1. The annular reservoir R, provided with central recess for the lamp L, in combination with the wells w, substantially as shown and described.

2. The reservoir R, in combination with the wells w, provided with the apertures o and i, substantially as and for the purposes set forth.

WILHELM R. H. SCHEUNERT.

Witnesses:
FRANK WALACE,
WILLIAM S. JOHNSTON.